United States Patent [19]
Olschewski

[11] Patent Number: 4,655,731
[45] Date of Patent: Apr. 7, 1987

[54] TENSIONING ARRANGEMENT FOR DRIVE BELTS
[75] Inventor: Armin Olschewski, Schweinfurt, Fed. Rep. of Germany
[73] Assignee: SKF GmbH, Schweinfurt, Fed. Rep. of Germany
[21] Appl. No.: 742,728
[22] Filed: Jun. 7, 1985
[30] Foreign Application Priority Data
Jun. 8, 1984 [DE] Fed. Rep. of Germany ... 8417466[U]
[51] Int. Cl.[4] .............................................. F16H 7/12
[52] U.S. Cl. ..................................... 474/137; 474/112
[58] Field of Search .............. 474/112, 113, 117, 136, 474/137, 138

[56] References Cited
U.S. PATENT DOCUMENTS
1,188,316 6/1916 Pierce .................................... 474/112
3,829,176 8/1974 Miokovic ........................ 474/112 X FOREIGN PATENT DOCUMENTS
2058815 5/1971 France .
588784 6/1947 United Kingdom ................ 474/112

Primary Examiner—James A. Leppink
Assistant Examiner—Thuy M. Bui
Attorney, Agent, or Firm—Rosen, Dainow & Jacobs

[57] ABSTRACT

A diametrical slot is provided in the bottom of the cup-shaped support of a tensioning roller assembly, for receiving a clamping bolt. A leaf spring is mounted in the bore and has a bending zone engaging the bolt, the leaf spring extending from on both sides of the bending zone to roll sections adapted to roll on and off the bore surface of the support so that, as tension is increased by the displacement of the bolt in the slot, a greater portion of the leaf spring rolls off of the bore surface of the support.

3 Claims, 2 Drawing Figures

TENSIONING ARRANGEMENT FOR DRIVE BELTS

This invention relates to a tensioning arrangement for transmission belts, wherein a cup-shaped support is mounted to be diametrically movable on a mounting bolt against the force of a spring, and rotatably supports a roller surface by means of a bearing.

A tensioning arrangement of this type is disclosed in French Pat. No. 2,058,815. In the arrangement disclosed in this reference, a helical spring is arranged between the clamping bolt and the bore surface of the support. The support in this arrangement also serves as the inner raceway of a rolling bearing. The helical spring urges the entire tension roller resiliently against a transmission belt when the clamping bolt is loosened. The adjustment path along a diametrical slot formed in the support is relatively short in this arrangement, since the helical spring has a large residual dimension in the compressed condition. The residual length remains relatively large even with the use of all possible technology for limiting the maximum possible adjustment path, which is limited by the bore dimension of the support. This disadvantage leads to the result that the known arrangement cannot be used, especially for tensioning longer drive belts, which are nowadays advantageously employed in automobiles.

It is the object of this invention to provide a tensioning arrangement for drive belts of the above type, in which a substantially larger adjustment path can be obtained while otherwise retaining the same characteristics.

In accordance with the invention, the above object is achieved by employing a leaf spring, stressed in bending, as the spring of the arrangement.

The leaf spring is so arranged that the adjustment path of the tension roller is reduced only by the thickness of the material of the leaf spring. Since the thickness of a leaf spring for such arrangements is generally in the millimeter range, a significant increase of the adjustment path is provided, in comparison with that when a helical spring is employed. The leaf spring is for example affixed to the bore surface of the support and lies with suitable curvature tangentially to the clamping bolt, so that the spring force acts substantially in the direction of the guide slot.

In order that the invention may be more clearly understood, it will now be disclosed in greater detail with reference to the accompanying drawings, wherein.

Figure 1:
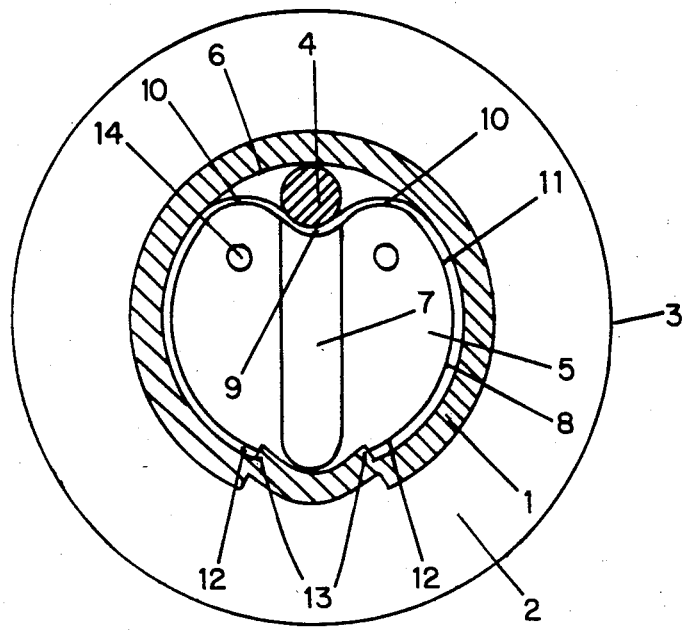
FIG. 1 is a cross-sectional view of a tensioning arrangement in accordance with the invention, in the relaxed condition.
Figure 2:
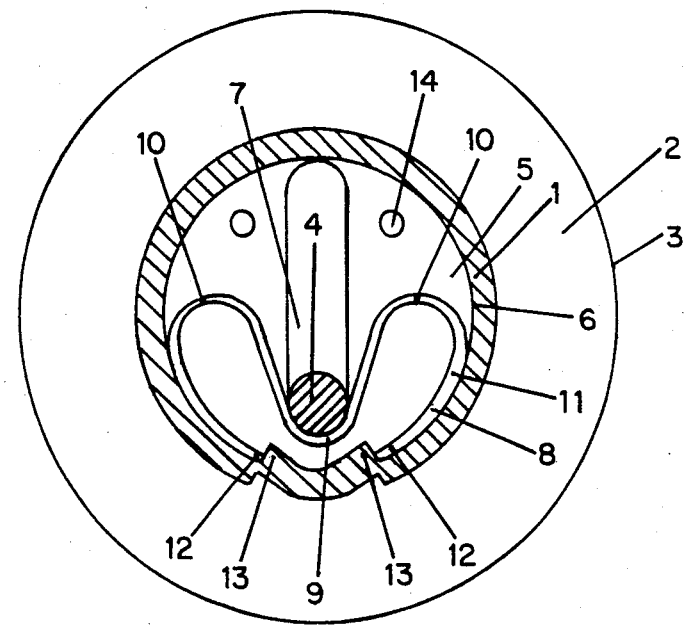
FIG. 2 illustrates the tensioning arrangement of FIG. 1 in the stressed condition.

Referring now to the drawings, FIGS. 1 and 2 illustrate a tensioning arrangement comprised of a support 1 and a roller surface 3 rotatably arranged thereover by means of a rolling bearing 2 (illustrated only symbolically). The tensioning arrangement is mounted by means of a clamping bolt 4 to a machine frame (not shown) and serves for tensioning a drive belt (not shown) running over the roller surface 3. The support 1 is a cup-shaped sheet metal part and has a diametrically extending guide slot 7 in its base 5 extending to the bore surface 6. The clamping bolt 4 extends through the guide slot 7 so that the entire tensioning arrangement is movable along this guide slot 7 and can be held fast by the tightening of the clamping bolt 4. A leaf spring 8 is inserted in the inner space of the support 1, with its central bending zone 9 engaging the clamping bolt 4. Both sides join to the roll sections 10 thereof, whose end regions join the sides 11 of the leaf spring engaging the bore surface 6 of the support 1. The free ends 12 of the leaf spring 8 are supported in the circumferential direction by radially inwardly extending projections 13 of the support 9.

FIG. 1 illustrates the tensioning arrangement in the rest position, i.e., in the not stressed position, of the spring. The clamping bolt 4 abuts the upper end of the guide slot 7, so that the active roller section 10 and the bending zone 9 likewise are located in the upper region. If the tensioning arrangement is moved along the guide slot 7, the bending zone 9 bends forwardly about the clamping bolt 4 and the roll section 10 rolls on the bore surface 6 of the support 1 downwardly against the force of the leaf spring 8. The tensioning arrangement is illustrated in the stressed position in FIG. 2, wherein the embracing of the clamping bolt 4 by the leaf spring is increased, and the roll section 10 has rolled off the bore surface 6 further downwardly. The maximum possible adjustment path is limited by the length of the guide slot 7, which can only extend up to the bore surface 6 of the support 1 and is reduced by the sheet metal thickness of the leaf spring 8. The adjustment of tension along the guide slot 7 can be effected by radially pushing the tensioning arrangement by rotating it about the clamping bolt by the adjacent drive belt. For this purpose recesses 14 are provided in the bottom of the support for receiving an adjustment tool (not shown). The tension force of the leaf spring can be varied by its sheet metal thickness.

The illustrated arrangement of the leaf spring 8 and its form constitute only one example of many possible variations of the invention, and it is intended in the following claims to cover each possible modification of the invention disclosed herein.

What is claimed is:

1. In a tensioning arrangement for drive belts comprised of a cup-shaped support mounted to be movable on a clamping bolt diametrically against the force of a spring, the clamping bolt extending through a guide slot in the bottom wall of the cup-shaped support, the spring extending between the bolt and support to urge the support to move in a direction with the bolt abutting one end of the guide slot, and a roller surface rotatably arranged on the support over a bearing, and wherein the spring is comprised of a strip shaped leaf spring stressed in bending, said leaf spring extending in a substantially radial plane with respect to said bolt with the width of said leaf spring extending parallel to the axis of said bolt; the improvement wherein the leaf spring extends in a curved path between said bolt and a given position on said support, said spring being fixed at said given position against relative motion between said spring and said support whereby movement of said bolt relative to said support away from said end of said slot reduces the distance between said bolt and said position on said support and decreases the radius of curvature of at least one region of said leaf spring.

2. In a tensioning arrangement for drive belts comprised of a cup-shaped support having a bore surface and being mounted to be movable on a clamping bolt diametrically against the force of a spring, and a roller surface rotatably arranged on the support over a bearing; the improvement wherein the spring is comprised of a leaf spring stressed in bending, the leaf spring having a bending zone in contact with the clamping bolt and a freely movable wall section extending from both sides of the bending zone and adapted to be supported against the bore surface of the support, said spring having a relaxed condition with a part of the leaf spring lying against the bore surface of the support and a stressed condition with a lesser part of the spring lying against the bore surface than in the relaxed condition thereof.

3. In a tensioning arrangement for drive belts comprised of a cup-shaped support having a bore surface and being mounted to be movable on a clamping bolt diametrically against the force of a spring, and a roller surface rotatably arranged on the support over a bearing; the improvement wherein the spring is comprised of a leaf spring stressed in bending, the support having a diametrically extending guide slot of the maximum possible width in its bore for receiving the clamping bolt, said spring having free ends affixed in the bore of the support adjacent one end of the guide slot.

* * * * *